(12) United States Patent
Pikhletsky et al.

(10) Patent No.: US 9,332,558 B2
(45) Date of Patent: May 3, 2016

(54) METHOD FOR ALLOCATING RADIO RESOURCES IN RELAY CELL, BASE STATION, AND SYSTEM

(71) Applicant: Huawei Technologies Co., Ltd., Shenzhen (CN)

(72) Inventors: Mikhail Pikhletsky, Shenzhen (CN); Jietao Zhang, Shenzhen (CN); Hongcheng Zhuang, Shenzhen (CN); Farid Khafizov, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 400 days.

(21) Appl. No.: 13/950,888

(22) Filed: Jul. 25, 2013

(65) Prior Publication Data

US 2013/0308521 A1 Nov. 21, 2013

Related U.S. Application Data

(63) Continuation of application No. PCT/CN2011/078919, filed on Aug. 25, 2011.

(30) Foreign Application Priority Data

Jan. 25, 2011 (CN) .......................... 2011 1 0027441

(51) Int. Cl.
  *H04W 72/08* (2009.01)
  *H04W 84/04* (2009.01)
  *H04W 24/02* (2009.01)

(52) U.S. Cl.
  CPC ............ *H04W 72/085* (2013.01); *H04W 24/02* (2013.01); *H04W 84/047* (2013.01)

(58) Field of Classification Search
  CPC ... H04W 84/047; H04W 16/26; H04W 88/04; H04B 7/155; H04B 7/2606
  See application file for complete search history.

(56) References Cited

U.S. PATENT DOCUMENTS

2005/0163111 A1* 7/2005 Ishii ........................ H04L 47/10
                                                        370/360
2008/0167980 A1   7/2008 Aaron et al.
(Continued)

FOREIGN PATENT DOCUMENTS

CN      101527934 A     9/2009
CN      101562816 A    10/2009
(Continued)

OTHER PUBLICATIONS

Kaneko et al., "Radio Resource Allocation Algorithm for Relay-aided Cellular OFDMA System" IEEE Communications Society, 2007, 6 pages.
(Continued)

*Primary Examiner* — Hassan Phillips
*Assistant Examiner* — Prenell Jones
(74) *Attorney, Agent, or Firm* — Brinks Gilson & Lione (57) ABSTRACT

A method for allocating radio resources, a base station, and a system are provided. The method includes: acquiring statistical average user satisfaction of each access point in a relay cell, where the access point includes the base station and a relay node in the relay cell, the average user satisfaction is an average ratio of a total user rate obtained by an access point to a total user rate required by the access point, where the average ratio is in a statistical period; and when a difference between the statistical average user satisfaction of the base station and the statistical average user satisfaction of each relay node approaches a preset value, determining a resource partitioning weight of each access point; and calculating radio resources of each access point according to the resource partitioning weight of each access point, and allocating the radio resources to each access point.

13 Claims, 5 Drawing Sheets

---

| The base station calculates a change rate of the resource partitioning weight of each access point according to a formula for calculating a change rate of a resource partitioning weight | 301 |

↓

| The base station integrates the change rate of the resource partitioning weight of each access point, to obtain a variation of the resource partitioning weight of each access point | 302 |

↓

| The base station calculates a sum of the variation of the resource partitioning weight of each access point and a current resource partitioning weight of the access point, to obtain the resource partitioning weight of each access point | 303 |

(56) References Cited

U.S. PATENT DOCUMENTS

| | | |
|---|---|---|
| 2008/0167990 A1 | 7/2008 | Grant |
| 2008/0188231 A1 | 8/2008 | Zhu et al. |
| 2008/0260000 A1 | 10/2008 | Periyalwar et al. |
| 2009/0003260 A1 | 1/2009 | Guo et al. |
| 2010/0035620 A1 | 2/2010 | Naden et al. |
| 2011/0235728 A1* | 9/2011 | Karabinis ........... H04W 72/046 375/260 |

FOREIGN PATENT DOCUMENTS

| | | |
|---|---|---|
| CN | 101610563 A | 12/2009 |
| CN | 101616418 A | 12/2009 |
| CN | 101730243 A | 6/2010 |
| CN | 101742667 A | 6/2010 |
| WO | WO 2009/155795 A1 | 12/2009 |

OTHER PUBLICATIONS

Li et al., "Reuse One Frequency Planning for Two-hop Cellular System with Fixed Relay Nodes" IEEE Communications Society, 2007, 6 pages.

Müller et al, "A Coordinated Resource Allocation Algorithm for Infrastructure-Based Relay Networks" EURASIP Journal on Advances in Signal Processing, vol. 2009, 14 pages.

ETSI, "LTE; Feasibility study for Further Advancements for E-UTRA (LTE-Advanced)(3GPP TR 36.912 version 9.2.0 Release 9)" ETSI TR 136 912, V9.2,0, Apr. 2010, 63 pages.

LTE, "3$^{rd}$ Generation Partnership Project; Technical Specification Group Radio Access Network; Evolved Universal Terrestrial Radio Access (E-UTRA); Further Advancements for E-UTRA physical layer aspects" (Release 9) 3GPP TR 36.814 V9.0.0, 104 Pages.

* cited by examiner

FIG. 1

| 201 | A base station acquires statistically average user satisfaction of each access point in a relay cell, where the access points include the base station and a relay node in the relay cell, and the statistically average user satisfaction is an average ratio of a total user rate obtained by the access point to a total user rate required by the access point in a statistical period |

| 202 | When a difference between the statistical average user satisfaction of the base station and the statistical average user satisfaction of each relay node approaches a preset value, the base station determines a resource partitioning weight of each access point |

| 203 | The base station calculates radio resources of each access point according to the resource partitioning weight of each access point and allocates the radio resources to each access point |

METHOD FOR ALLOCATING RADIO RESOURCES IN RELAY CELL, BASE STATION, AND SYSTEM

CROSS-REFERENCE TO RELATED APPLICATIONS

This application is a continuation of International Application No. PCT/CN2011/078919, filed on Aug. 25, 2011, which claims priority to Chinese Patent Application No. 201110027441.7, filed with the Chinese Patent Office on Jan. 25, 2011, both of which are incorporated herein by reference in its entirety.

FIELD OF THE INVENTION

The present invention relates to the field of communications technologies, and in particular, to a method for allocating radio resources in a relay cell, a base station, and a system.

BACKGROUND OF THE INVENTION

As new network architecture of mobile communications, a relay network is accepted by the 3rd Generation Partnership Project (The 3rd Generation Partnership Project, 3GPP) and is one of key technologies of a Long Term Evolution-Advanced (Long Term Evolution-Advanced, LTE-A) system.

In the relay network, a base station and one or more relay nodes (Relay Node, RN) are deployed at the same time in a relay cell. The relay node is connected to the base station through radio resources. A user equipment (User Equipment, UE) may be directly connected to the base station to access the network; alternatively, the user equipment may also be connect to the relay node and then access the network through the base station, that is, the user equipment accesses the network in a two-hop link manner. With the deployment of the relay node, the relay cell can improve the channel capacity of the user equipment and especially the channel capacity of an edge user equipment, reduce space loss of the radio resources, and increase a signal-to-noise ratio. Therefore, the system capacity of the entire relay network is improved.

In the relay cell, the radio resources between the base station and the user equipment, between the base station and the relay node, and between the relay node and the user equipment are collectively referred to as resources in the relay cell. Compared with a traditional cell with a single base station, the relay cell has a two-hop link. The user equipment can access the network in a two-hop link manner. Therefore, the resource allocation in the relay cell is greatly different from the resource allocation in the traditional cell with a single base station. At present, there is no solution that can implements effective allocation of the resources in the relay cell and satisfies the requirements for multiple key performance indicators (Key Performance Indicators, KPIs) of the system, such as user fairness and system capacity.

SUMMARY OF THE INVENTION

In view of the preceding defects, embodiments of the present invention provide a method for allocating radio resources in a relay cell, a base station, and a system, to implement effective allocation of radio resources in a relay cell and satisfy the requirements for system user fairness and system capacity.

An embodiment of the present invention provides a method for allocating radio resources in a relay cell, including:

acquiring, by a base station, statistical average user satisfaction of each access point in a relay cell, where the access point includes the base station and a relay node in the relay cell, and the statistical average user satisfaction is an average ratio of a total user rate obtained by an access point to a total user rate required by the access point, where the average ratio is in a statistical period;

determining, by the base station, a resource partitioning weight of each access point when a difference between the statistical average user satisfaction of the base station and the statistical average user satisfaction of each relay node approaches a preset value; and calculating, by the base station, radio resources of each access point according to the resource partitioning weight of each access point, and allocating the radio resources to each access point.

Correspondingly, an embodiment of the present invention also provides a base station applied in a relay cell. The base station includes:

an acquiring unit, configured to acquire statistical average user satisfaction of each access point in the relay cell, where the access point includes the base station and a relay node in the relay cell, and the statistical average user satisfaction is an average ratio of a total user rate obtained by an access point to a total user rate required by the access point, where the average ratio is in a statistical period;

a determining unit, configured to determine a resource partitioning weight of each access point when a difference between the statistical average user satisfaction of the base station and the statistical average user satisfaction of each relay node approaches a preset value;

a calculating unit, configured to calculate radio resources of each access point according to the resource partitioning weight of each access point; and an allocating unit, configured to allocate the radio resources of each access point to each access point.

Correspondingly, an embodiment of the present invention further provides a relay cell system, including:

a base station, configured to acquire statistical average user satisfaction of each access point in a relay cell, where the access point includes the base station and a relay node in the relay cell, and the statistical average user satisfaction is an average ratio of a total user rate obtained by an access point to a total user rate required by the access point, where the average ratio is in a statistical period; determine a resource partitioning weight of each access point when a difference between the statistical average user satisfaction of the base station and the statistical average user satisfaction of each relay node approaches a preset value; calculate radio resources of each access point according to the resource partitioning weight of each access point and allocate the radio resources to each access point; and the relay node, configured to periodically report the statistical average user satisfaction of the relay node to the base station and receive the radio resources allocated by the base station.

In the embodiments of the present invention, the base station first acquires the statistical average user satisfaction of each access point (including the base station and the relay node in the relay cell) in the relay cell, determines the resource partitioning weight of each access point when the difference between the statistical average user satisfaction of the base station and the statistical average user satisfaction of each relay node approaches the preset value, calculates the radio resources of each access point according to the resource partitioning weight of each access point, and allocates the radio resources to each access point. When the preset value is 0, values of the statistical average user satisfaction of each access point in the relay cell are identical. In this situation, the user fairness of each access point in the relay cell is optimized. When the preset value is greater, the system capacity is larger. This sacrifices the user fairness. Therefore, compromise between the user fairness and the system capacity may be achieved by selecting a proper preset value. In this way, in the embodiments of the present invention, effective allocation of the resources in the relay cell is implemented and the requirements for user fairness and system capacity are satisfied.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solution according to the embodiment of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

Before the method for allocating resources in a relay cell, the base station, and the system according to embodiments of the present invention are described in detail, an embodiment of the present invention first describes the relay cell involved in the embodiments of the present invention.

Figure 1:
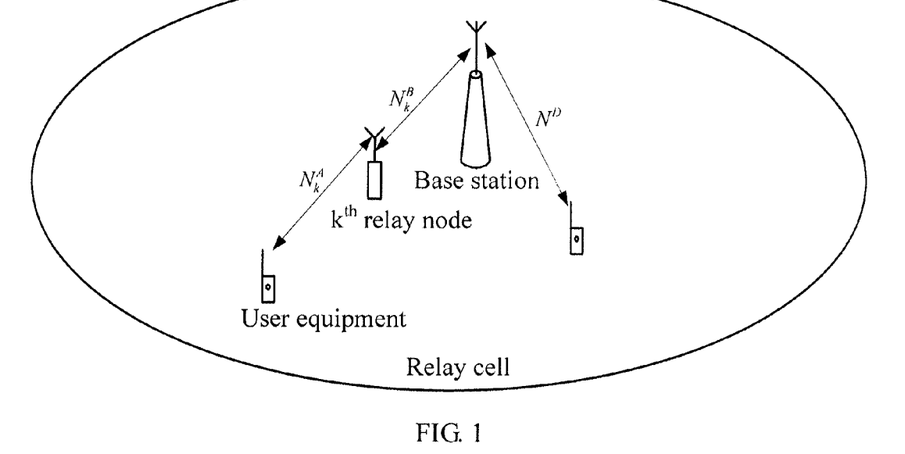
FIG. 1 is a schematic diagram of relay cell resource distribution according to an embodiment of the present invention.

In the embodiment of the present invention, a base station and K relay nodes (an index of each of the relay nodes is k=1, ..., K) are deployed in any relay cell in a relay network, as shown in FIG. 1. The base station involved in the embodiment of the present invention may be an Evolved NodeB (Evolved NodeB, eNB) or a conventional Node B (Node B), which is not limited in the embodiment of the present invention. In the embodiment of the present invention, the base station and the relay nodes in the relay cell may be referred to as access points (Access Points, APs).

As shown in FIG. 1, in the embodiment of the present invention, radio resources in the relay cell may be classified into the following three types:

Type 1: radio resources between the base station and a user equipment served by the base station (which is also referred to as a direct link), indicated by $N^D$;

Type 2: radio resources between a $k_{th}$ relay node and a user equipment served by the $k^{th}$ relay node (which is also referred to as an access link), indicated by $N_k^A$; and Type 3: radio resources between the $k^{th}$ relay node and the base station (which is also referred to as a return link), indicated by $N_k^B$.

$N^D$, $N_k^A$, and $N_k^B$ satisfy:

$$N^D + \sum_{k=1}^{K}(N_k^A + N_k^B) = N,$$

where N indicates the total number of radio resource blocks in the relay cell, $$N^D + \sum_{k=1}^{K} N_k^B$$

indicates the number of radio resource blocks used by the base station for transmission, and $N_k^A$ indicates the number of radio resource blocks used by the $k^{th}$ relay node for transmission.

In the embodiment of the present invention, it is assumed that the relay node with a sequence number of k serves $M_k$ user equipments and an index of each user equipment is m=1, ..., $M_k$; and the base station serves M user equipments and an index of each user equipment is m=1, ..., M. In this case, user satisfaction $Z_{m,k}$ of an $m^{th}$ user equipment is defined as a ratio of a user rate $R_{m,k}$ obtained by the user equipment to a user rate $G_{m,k}$ required by the user equipment, that is, $$Z_{m,k} = \frac{R_{m,k}}{G_{m,k}}.$$

Correspondingly, average user satisfaction of the $k^{th}$ relay node is $$Z_k^A = \frac{1}{M_k} \sum_{m=1}^{M_k} \frac{R_{m,k}}{G_{m,k}}$$

and a total user rate obtained by the $k^{th}$ relay node is $$R_k^A = \sum_{m=1}^{M_k} R_{m,k}.$$

The average user satisfaction $Z_k^A$ of the $k^{th}$ relay node is determined by a total user rate $$G_k^A = \sum_{m=1}^{M_k} G_{m,k}$$

required by the $k^{th}$ relay node and the total user rate $R_k^A$ obtained by the $k^{th}$ relay node, that is, $$Z_k^A = \frac{1}{M_k} \sum_{m=1}^{M_k} \frac{R_{m,k}}{G_{m,k}} = \frac{1}{M_k} \sum_{m=1}^{M_k} \frac{G_{m,k}}{G_{m,k} G_k^A} R_k^A = \frac{R_k^A}{G_k^A},$$

$k=1, \ldots, K$. Likewise, for the base station, the following relationship exists:

$$Z^D = \frac{R^D}{G^D},$$

where $Z^D$ indicates average user satisfaction of the base station, $R^D$ indicates a total user rate obtained by the base station, and $G^D$ indicates a total user rate required by the base station. In the relay cell, each access point calculates statistical average user satisfaction according to the average user satisfaction of each access point in a given statistical period, where the statistical satisfaction is defined as $$\overline{Z}[t] = \frac{T-1}{T}\overline{Z}[t-1] + \frac{1}{T}Z[t-1]$$

and T indicates the statistical period. For the base station, the statistical average user satisfaction is $$\overline{Z}^D[t] = \frac{T-1}{T}\overline{Z}^D[t-1] + \frac{1}{T}Z^D[t-1].$$

For the $k^{th}$ relay node, the statistical average user satisfaction is $$\overline{Z}_k^A[t] = \frac{T-1}{T}\overline{Z}_k^A[t-1] + \frac{1}{T}Z_k^A[t-1].$$

Based on the description for the relay cell, the method for allocating resources in a relay cell, the base station, and the system according to the embodiments of the present invention are described below, through which effective allocation of radio resources in a relay cell is implemented and the requirements for user fairness and system capacity are satisfied. Detailed descriptions are given below.

Embodiment 1

Figure 2:
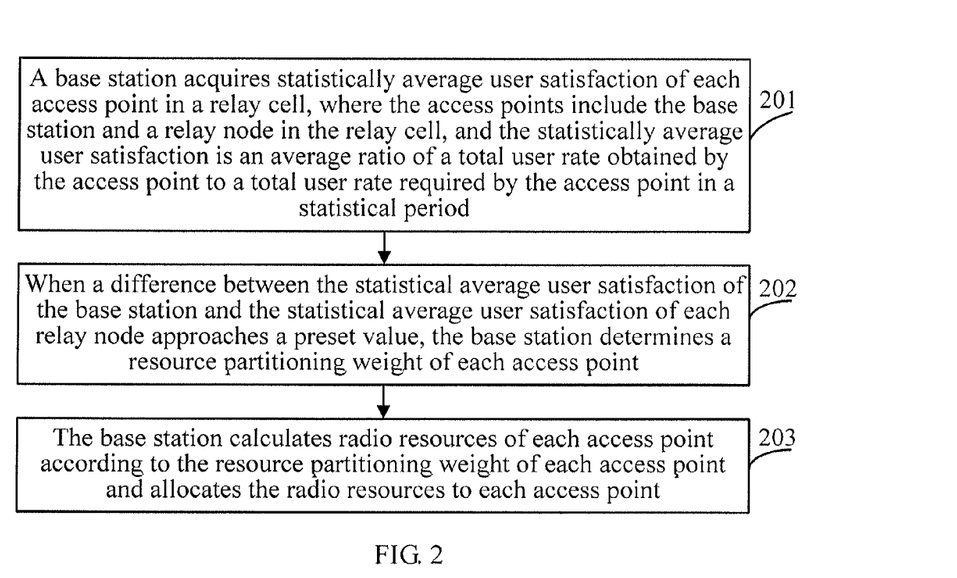
FIG. 2 is a schematic flow chart of a method for allocating resources in a relay cell according to an embodiment of the present invention.

FIG. 2 is a schematic flow chart of a method for allocating resources in a relay cell according to Embodiment 1 of the present invention. The method for allocating resources may include the following steps:

201: A base station acquires statistical average user satisfaction of each access point in a relay cell, where the access point includes the base station and a relay node in the relay cell, and the statistical average user satisfaction is an average ratio of a total user rate obtained by an access point to a total user rate required by the access point, where the average ratio is in a statistical period.

In the relay cell, the base station may collect statistics of a total user rate $R^D$ obtained by the base station, calculate a ratio of the total user rate $R^D$ obtained by the base station to a total user rate $G^D$ required by the base station, where the ratio is the average user satisfaction $Z^D$ of the base station, and calculate the statistical average user satisfaction $\overline{Z}^D$ of the base station in a statistical period according to $Z^D$.

In the relay cell, the base station may receive the statistical average user satisfaction $\overline{Z}_k^A$ reported by each relay node in the relay cell. The relay node in the relay cell may collect statistics of a total user rate $R_k^A$ obtained by the relay node, calculate a ratio of the total user rate $R_k^A$ obtained by the relay node to a total user rate $G_k^A$ required by the relay node, where the ratio is the average user satisfaction $Z_k^A$ of the relay node, calculate the statistical average user satisfaction $\overline{Z}_k^A$ of the relay node in a statistical period according to $Z_k^A$ and report $\overline{Z}_k^A$ to the base station.

202: When a difference between the statistical average user satisfaction of the base station and the statistical average user satisfaction of each relay node approaches a preset value, the base station determines a resource partitioning weight of each access point.

In the embodiment of the present invention, the preset value may be greater than or equal to 0.

For example, when the preset value is 0, the statistical average user satisfaction of the base station and each relay node in the relay cell is identical. In this situation, user fairness of each access point in the relay cell is optimized. When the preset value is greater, the system capacity is larger. This sacrifices the user fairness. Therefore, compromise between the user fairness and the system capacity may be achieved by selecting a proper preset value, to satisfy the requirement for user fairness and the requirement for system capacity.

203: The base station calculates radio resources of each access point according to the resource partitioning weight of each access point and allocates the radio resources to each access point.

In the embodiment of the present invention, the base station may calculate the radio resources of each access point according to the resource partitioning weight of each access point after determining the resource partitioning weight of each access point. As an alternative implementation, the base station may calculate a proportion of the resource partitioning weight of each access point present in a sum of the resource partitioning weight of each access point; and then calculate a product of the proportion of the resource partitioning weight of each access point and the total number of radio resource blocks in the relay cell, so as to obtain the radio resources of each access point and allocate the radio resources to each access point.

Figure 3:
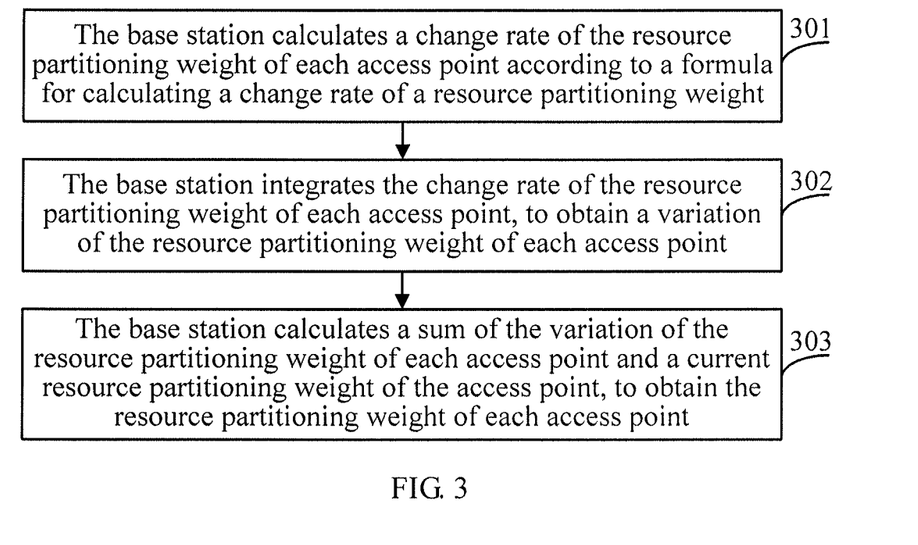
FIG. 3 is a schematic structural diagram of a base station according to an embodiment of the present invention.

As an alternative implementation, the determining the resource partitioning weight of each access point in step 202 may specifically be implemented by using a method as shown in FIG. 3, which includes the following steps.

301: When the difference between the statistical average user satisfaction of the base station and the statistical average user satisfaction of each relay node approaches the preset value, the base station calculates a change rate of the resource partitioning weight of each access point according to a formula for calculating a change rate of a resource partitioning weight.

The formula for calculating a change rate of a resource partitioning weight satisfies: u=−Fx, where u indicates a change rate vector of the resource partitioning weight of each access point; F indicates a feedback gain matrix; and x indicates a status vector and x satisfies the following condition:

$$x[t] = \begin{bmatrix} \Delta \overline{Z}[t] \\ \Delta \overline{Z}_1[t] \\ w[t] \end{bmatrix},$$

where $\Delta \overline{Z}[t]$ indicates a difference vector between the statistical average user satisfaction $\overline{Z}^D$ of the base station and the statistical average user satisfaction $\overline{Z}_k^A$ of each relay node; $\Delta \overline{Z}_1[t]$ indicates an integral vector of the difference between the statistical average user satisfaction $\overline{Z}^D$ of the base station and the statistical average user satisfaction $\overline{Z}_k^A$ of each relay node; w[t] indicates a current resource partitioning weight vector of each access point; and t indicates a calculation time.

302: The base station integrates the change rate of the resource partitioning weight of each access point, to obtain a variation of the resource partitioning weight of each access point.

303: The base station calculates a sum of the variation of the resource partitioning weight of each access point and a current resource partitioning weight of the access point, to obtain the resource partitioning weight of each access point.

As an alternative implementation, in the method for allocating resources in a relay cell provided in the embodiment of the present invention, each access point in the relay cell may perform user scheduling to maximize the network utility after obtaining the radio resources allocated by the base station.

For example, each access point may perform user scheduling by using a general scheduling rule based on a parameter γ.

The parameter γ satisfies the following conditions:

$$\max. \sum_{m=1}^{M} \frac{1}{1-\gamma} \left( \frac{1}{T_b} \sum_{i=1}^{N} \sum_{j=1}^{N} b_{ij}^{(m)} x_{ij}^{(m)} \right)^{1-\gamma}$$

$$\text{s.t.} \sum_{m=1}^{N} \sum_{j=1}^{N} x_{ij}^{(m)} \leq \frac{T}{2}, 1 \leq i \leq N,$$

$$\sum_{m=1}^{N} \sum_{i=1}^{N} x_{ij}^{(m)} \leq \frac{T}{2}, 1 \leq i \leq N,$$

$$x_{ij}^{(m)} \in \left\{ 0, \ldots, \frac{T}{2} \right\}, 1 \leq i, j \leq N, 1 \leq m \leq M,$$

where max.* indicates maximization of network utility, M indicates the number of users, N indicates the total number of radio resource blocks in the relay cell, $T_b$ indicates a duration of each radio resource block, $b_{ij}^m$ indicates the bit number of a user m on a subcarrier pairing (i,j), and $x_{ij}^{(m)}$ indicates the number of radio resource blocks allocated to the user m on the subcarrier pairing (i,j).

In Embodiment 1 of the present invention, the base station first acquires the statistical average user satisfaction $\overline{Z}^D$ of the base station and the statistical average user satisfaction $\overline{Z}_k^A$ of each relay node in the relay cell, determines the resource partitioning weight of each access point when the difference between the statistical average user satisfaction $\overline{Z}^D$ of the base station and the statistical average user satisfaction $\overline{Z}_k^A$ of each relay node approaches a preset value, calculates the radio resources of each access point according to the resource partitioning weight of each access point, and allocates the radio resources to each access point. When the preset value is 0, the average user satisfaction of each access point in the relay cell is identical. In this situation, the user fairness of each access point in the relay cell is optimized. When the preset value is greater, the system capacity is larger. This sacrifices the user fairness. Therefore, compromise between the user fairness and the system capacity may be achieved by selecting a proper preset value. In this way, in the embodiment of the present invention, effective allocation of the resources in the relay cell is implemented and the requirements for system user fairness and system capacity are satisfied.

Embodiment 2

In Embodiment 2 of the present invention, a method for allocating resources in a relay cell may be performed at two levels. A first level is a radio resource allocation level, at which a base station partitions radio resources in a relay cell and allocates the resources to each access point in the relay cell. A second level is a user scheduling level, at which each access point schedules users of each access point to maximize network utility. At the first level of partitioning the relay cell radio resources, in Embodiment 2 of the present invention, two important different parameters KPIs are considered, one is user fairness, and the other is system capacity. In addition, in Embodiment 2 of the present invention, the partitioning of the radio resources in the relay cell at the first level is described in two parts, where the first part describes a method for partitioning the radio resources based on the user fairness and the second part describes a method for partitioning the radio resources based on the system capacity. Finally, the two methods for partitioning the radio resources are combined and a compromise method considering the user fairness and the system capacity is described.

1) Partition of the Radio Resources in the Relay Cell Based on the User Fairness:

In Embodiment 2 of the present invention, two parameters are defined, including $w_k$ indicating a resource partitioning weight of a $k^{th}$ relay node, and $w_0$ indicating a resource partitioning weight of the base station. In this case, the number $N_k^A$ of radio resource blocks allocated by the base station to the $k^{th}$ relay node for transmission satisfies formula (1):

$$N_k^A = \frac{w_k}{w_0 + \sum_{l=1}^{K} w_l} N \qquad (1)$$

Correspondingly, the number $$N^D + \sum_{k=1}^{K} N_k^B$$

of radio resource blocks allocated by the base station to the base station for transmission satisfies formula (2):

$$N^D + \sum_{k=1}^{K} N_k^B = \frac{w_0}{w_0 + \sum_{l=1}^{K} w_l} N \quad (2)$$

where N indicates the total number of the radio resource blocks in the relay cell, $$\sum_{l=1}^{K} w_l$$

indicates a sum of the resource partitioning weights of K relay nodes, and $$w_0 + \sum_{l=1}^{K} w_l$$

indicates a sum of the resource partitioning weights of all access points (including the base station and the K relay nodes).

Formula (1) and formula (2) correspond to step 203 in Embodiment 1. After obtaining the resource partitioning weight of each relay node and the resource partitioning weight of the base station, the base station may calculate radio resources of each relay node and radio resources of the base station according to formula (1) and formula (2).

Taylor series expansion of formula (1) is performed, then:

$$N_k^A(w_1, \ldots, w_K) \approx \quad (3)$$

$$N_k^A(\tilde{w}_1, \ldots, \tilde{w}_K) + \sum_{l=1}^{K} (w_l - \tilde{w}_l) \cdot \frac{\partial N_k^A}{\partial w_l}(\tilde{w}_1, \ldots, \tilde{w}_K)$$

$$\frac{\partial N_k^A}{\partial w_k} = \frac{-w_k + w_0 + \sum_{l=1}^{K} w_l}{\left(w_0 + \sum_{l=1}^{K} w_l\right)^2} N \quad (4)$$

$$\frac{\partial N_k^A}{\partial w_{n \neq k}} = \frac{-w_k}{\left(w_0 + \sum_{l=1}^{K} w_l\right)^2} N \quad (5)$$

Taylor series expansion of formula (2) is performed, then:

$$N^D(w_1, \ldots, w_K) \approx \quad (6)$$

$$N^D(\tilde{w}_1, \ldots, \tilde{w}_K) + \sum_{l=1}^{K} (w_l - \tilde{w}_l) \cdot \frac{\partial N^D}{\partial w_l}(\tilde{w}_1, \ldots, \tilde{w}_K)$$

$$\frac{\partial N^D}{\partial w_k} = \frac{-w_0}{\left(w_0 + \sum_{l=1}^{K} w_l\right)^2} N \quad (7)$$

where $(\tilde{w}_1, \ldots, \tilde{w}_K)$ indicates resource partitioning weights of the K relay nodes in an initial state, and $(\tilde{w}_1, \ldots, \tilde{w}_K)$ may be set by an operator according to an actual requirement or experience.

The linear point $(\tilde{w}_1, \ldots, \tilde{w}_K)$ may be selected to satisfy: $\tilde{Z}^D = \tilde{Z}_k^A$, k=1, ..., K, where $\tilde{Z}^D$ indicates average user satisfaction of the base station in the initial state, and $\tilde{Z}_k^A$ indicates average user satisfaction of a $k^{th}$ relay node in the initial state.

In the embodiment of the present invention, a fixed resource partitioning mechanism may be used to calculate the number $\tilde{N}_k^A$, k=1, ..., K of radio resource blocks of the $k^{th}$ relay node in the initial state. The fixed resource partitioning refers to resource partitioning when topologies of all access points in the relay cell are determined (it may be assumed that the users are evenly distributed). In this way, $\tilde{N}^D$, $\tilde{N}_k^A$, k=1, ..., K is obtained, and $\tilde{Z}^D = \tilde{Z}_k^A$, k=1, ..., K is obtained through calculation. In this case:

$$\tilde{w}_k = \frac{\tilde{w}_0 \tilde{N}_k^A}{\tilde{N} - \sum_{l=1}^{K} \tilde{N}_l^A} \quad (8)$$

where $\tilde{w}_0$ indicates a resource partitioning weight of the base station in the initial state, $\tilde{N}$ indicates the total number of radio resource blocks in the relay cell in the initial state, and generally, $\tilde{N} = N$. A linear term in the Taylor series expansion may be used to obtain a linear difference, where the linear difference is used to express how the resource partitioning weight affects statistical average user satisfaction of the relay node and the base station:

$$\overline{Z}_k^A[t] = \frac{T-1}{T} \overline{Z}_k^A[t-1] + \frac{1}{T} \tilde{Z}_k^A + \frac{1}{T} \cdot \frac{C_k^A N}{S\left(\tilde{w}_0 + \sum_{l=1}^{K} \tilde{w}_l\right)^2} \cdot \quad (9)$$

$$\left(\left(-\tilde{w}_k + \tilde{w}_0 + \sum_{l=1}^{K} \tilde{w}_l\right)(w_k[t-1] - \tilde{w}_k) - \tilde{w}_k \sum_{n \neq k}^{K} w_n[t-1] - \tilde{w}_n\right)$$

where $\overline{Z}_k^A[t]$ indicates statistical average user satisfaction of a $k^{th}$ relay node, T indicates a statistical period, $C_k^A$ indicates a unit resource capacity of an access link of the $k^{th}$ relay node, $\tilde{Z}_k^A$ indicates the average user satisfaction of the $k^{th}$ relay node in the initial state, and S indicates the number of subframes in a frame; and $$\overline{Z}^D[t] = \quad (10)$$

$$\frac{T-1}{T} \overline{Z}^D[t-1] + \frac{1}{T} \tilde{Z}^D - \frac{1}{T} \cdot \frac{C^D N \tilde{w}_0}{S\left(\tilde{w}_0 + \sum_{l=1}^{K} \tilde{w}_l\right)^2} \sum_{l=1}^{K} w_l[t-1] - \tilde{w}_l$$

where $\overline{Z}^D[t]$ indicates statistical average user satisfaction of the base station, $\tilde{Z}^D$ indicates the average user satisfaction of the base station in the initial state, and $C^D$ indicates a unit resource capacity of a direct link of the base station.

Formula (9) and formula (10) correspond to step 201 in Embodiment 1. The base station may obtain the statistical average user satisfaction of the relay node and the base station according to formula (9) and formula (10).

Based on formula (9) and formula (10), in Embodiment 2 of the present invention, the following markers are introduced:

$$\Delta \bar{Z}[t] = (\bar{Z}^D[t] - \bar{Z}_1^A[t], \ldots, \bar{Z}^D[t] - \bar{Z}_K^A[t])^T \quad (11)$$

$$\delta w[t] = (w_1[t] - \tilde{w}_1, \ldots, w_K[t] - \tilde{w}_K)^T \quad (12)$$

$$A_1 = \frac{T-1}{T}I \quad (13)$$

$$A_2 = -\frac{NC^D \tilde{w}_0}{TS\left(\tilde{w}_0 + \sum_{l=1}^{K} \tilde{w}_l\right)^2} \cdot \begin{bmatrix} 1 & \cdots & 1 \\ \vdots & \ddots & \vdots \\ 1 & \cdots & 1 \end{bmatrix} + \frac{N}{TS\left(\tilde{w}_0 + \sum_{l=1}^{K} \tilde{w}_l\right)^2} \cdot \begin{bmatrix} C_1^A\left(\tilde{w}_1 - \tilde{w}_0 - \sum_{l=1}^{K} \tilde{w}_l\right) & C_1^A \tilde{w}_1 & \cdots & C_1^A \tilde{w}_1 \\ & \ddots & & \\ C_K^A \tilde{w}_K & \cdots & C_K^A \tilde{w}_K & C_K^A\left(\tilde{w}_K - \tilde{w}_0 - \sum_{l=1}^{K} \tilde{w}_l\right) \end{bmatrix} \quad (14)$$

where I indicates a K×K unit matrix. In this case, that the following equation is obtained:

$$\Delta \bar{Z}[t] = A_1 \cdot \Delta \bar{Z}[t-1] + A_2 \cdot \delta w[t-1] \quad (15)$$

where $\Delta \bar{Z}[t]$ indicates a difference between the statistical average user satisfaction of the base station and the statistical average user satisfaction of a $k^{th}$ relay node. To make $\Delta \bar{Z}[t]$ approach 0 (0 is a preset value and the user fairness is optimized in this situation), an integral $\Delta \bar{Z}_1[t]$ of $\Delta \bar{Z}[t]$ is introduced:

$$\Delta \bar{Z}_1[t] = \Delta \bar{Z}_1[t-1] + \tau I \cdot \Delta \bar{Z}[t-1] \quad (16)$$

In addition, in the embodiment of the present invention, a linear quadratic optimal controller may be used to output a change rate u[t] of the resource partitioning weight and a variation δw[t] of the resource partitioning weight of each access point as intermediate system states, where δw[t] may be updated by integrating u[t], that is, δw[t] and u[t] satisfy the following relationship:

$$\delta w[t] = \delta w[t-1] + \tau I \cdot u[t-1] \quad (17)$$

The base station may calculate a sum of the variation δw[t] of the resource partitioning weight of each access point and a current resource partitioning weight w[t] of the access point to obtain the resource partitioning weight of each access point.

τ indicates a length of each frame. The system is expressed by a status vector x[t], where input vectors of the system are u[t], a system matrix A and a system matrix B. The status vector x[t] satisfies the following conditions:

$$x[t] = \begin{bmatrix} \Delta \bar{Z}[t] \\ \Delta \bar{Z}_1[t] \\ w[t] \end{bmatrix} \quad (18)$$

$$A = \begin{bmatrix} A_1 & 0 & A_2 \\ \tau I & I & 0 \\ 0 & 0 & I \end{bmatrix}, \quad B = \begin{bmatrix} 0 \\ 0 \\ \tau I \end{bmatrix} \quad (19)$$

$$x[t] = Ax[t-1] + Bu[t-1] \quad (20)$$

where w[t] indicates the current resource partitioning weight of the access point and 0 is a 0 matrix of K×K. For a system represented by formula (20), the following performance index J may be minimized to obtain a linear quadratic optimal controller:

$$J = \sum_{t=1}^{\infty} x^T[t]Qx[t] + u^T[t]Ru[t] \quad (21)$$

If the following parameters are defined:

$$Q = \begin{bmatrix} I & 0 & 0 \\ 0 & I & 0 \\ 0 & 0 & 0 \end{bmatrix}, \quad R = \rho I \quad (22)$$

where ρ is a manually adjustable parameter, when the value of ρ is higher, the dynamic change of resource allocation is slower, and when the value of ρ is lower, the dynamic change of resource allocation is faster, and the performance index J may be modified as:

$$J = \sum_{t=1}^{\infty} \left( \sum_{k=1}^{K} \Delta \bar{Z}_k[t]^2 + \sum_{k=1}^{K} \Delta \bar{Z}_{1,k}[t]^2 + \rho \sum_{k=1}^{K} u_k[t]^2 \right) \quad (23)$$

A minimized linear quadratic optimal controller of formula (23) is a state feedback linear regulator compliant with the following manner:

$$u = -Fx \quad (24)$$

where the feedback gain matrix F is calculated by using formula (25):

$$F = (R + B^T P B)^{-1} B^T P A \quad (25)$$

where P is a solution satisfying formula (26):

$$P = Q + A^T (P - PB(R + B^T P B)^{-1} B^T P) A \quad (26)$$

2) Partition of the Radio Resources in the Relay Cell Based on the System Capacity In Embodiment 2 of the present invention, when an aim for the system is to maximize the system capacity, a preset value O≥0 may be introduced to express an increased or decreased offset of $\Delta \bar{Z}_k^A$ ($\Delta \bar{Z}_k^A$ indicates the difference between the statistical average user satisfaction of the base station and the statistical average user satisfaction of the $k^{th}$ relay node). Three cases may be classified herein. When the capacity of all relay nodes is identical to the capacity of the direct link of the base station, the preset value is O=0. When the capacity of all relay nodes is less than the capacity of the direct link of the base station, all resources of the system should be allocated to the base station to perform direct link transmission, and in this situation, the preset value is O>0, and $Z^D=Z_k^A+O$, k=1, ..., K; and $N^D=N$ and a maximum preset value is $$O_{max}^D = Z^D = \frac{R^D}{G^D} = \frac{C^D N}{SG^D}.$$

When the capacity of a certain relay node is greater than the capacity of the direct link of the base station, all resources of the system should be allocated to the relay node with the largest capacity, that is, an $l^{th}$ relay node satisfying l=arg max($c_1, \ldots, c_K$) (where $c_k$ indicates the capacity of the $k^{th}$ relay node). In this situation, the preset value is O>0 and the preset value O should be accumulated to $\Delta Z_l^A$. In this case, $$N_l^A + \frac{C_l^A}{C_l^B} N_l^A = N,$$

and a maximum preset value is $$O_{max}^l = Z_l^A = \frac{R_l^A}{G_l^A} = \frac{C_l^A N_l^A}{SG_l^A} = \frac{C_l^A C_l^B N}{SG_l^A (C_l^A + C_l^B)}.$$

As such, $O_{max}=\min\{O_{max}^D, O_{max}^l\}$ may be set. In Embodiment 2 of the present invention, the selection of the preset value O determines a degree of compromise between the user fairness and the system capacity. When the preset value O is greater, the system capacity is larger. However, this is acquired at the cost of user fairness. In Embodiment 2 of the present invention, compromise between the user fairness and the system capacity is made and a corresponding preset value O is obtained. In Embodiment 2 of the present invention, that the difference between the statistical average user satisfaction $Z^D$ of the base station and the statistical average user satisfaction $Z_k^A$ of each relay node approaches the preset value O may be used as a setting condition, and the resource partitioning weight of each access point is determined according to this setting condition.

Figure 4:
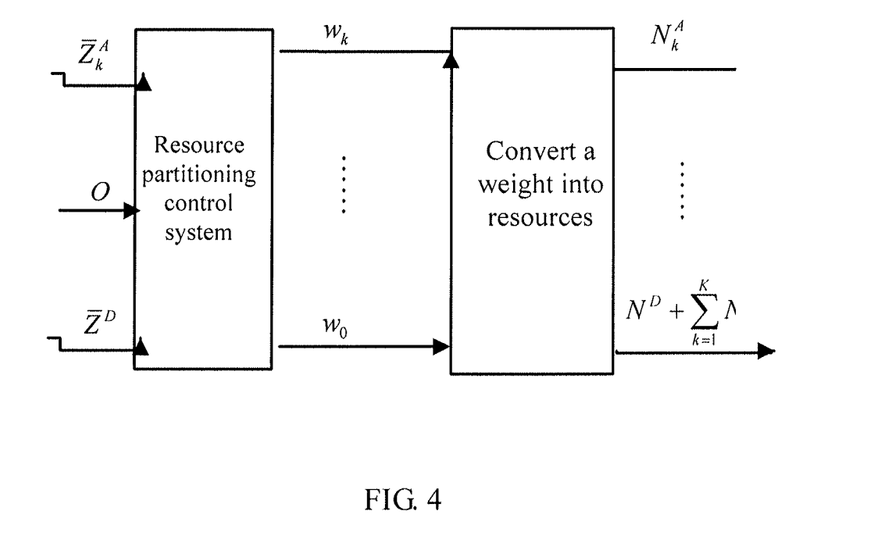
FIG. 4 is a schematic structural diagram of a system for generating a resource partitioning weight of an access point according to an embodiment of the present invention.

Taking a system for generating a resource partitioning weight of an access point shown in FIG. 4 as an example, the statistical average user satisfaction $Z^D$ of the base station, the statistical average user satisfaction $Z_k^A$ of the relay node, and the preset value O may be input as input parameters into a linear quadratic control system (Linear Quadratic Control System) of the system, to obtain the resource partitioning weight $w_0$ of the base station and the resource partitioning weight $w_k$ of the $k^{th}$ (k=1, ..., K) relay node. Then, the resource partitioning weight $w_0$ of the base station and the resource partitioning weight $w_k$ of the $k^{th}$ (k=1, ..., K) relay node are separately converted into radio resources, that is, the number $$N^D + \sum_{k=1}^{K} N_k^B$$

of the radio resource blocks of the base station and the number $N_k^A$ of the radio resource blocks of the $k^{th}$ (k=1, ..., K) relay node are calculated according to the resource partitioning weight $w_0$ of the base station and the resource partitioning weight $w_k$ of the $k^{th}$ (k=1, ..., K) relay node.

Figure 5:
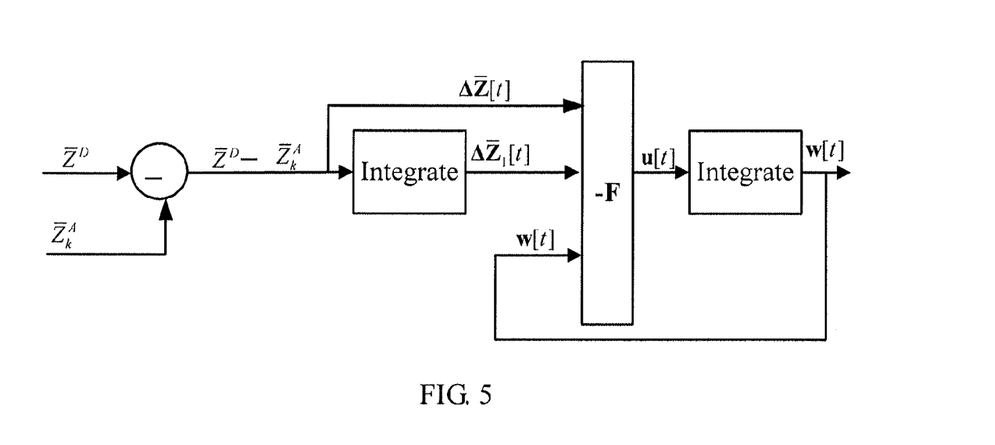
FIG. 5 is a schematic structural diagram of a resource partitioning control system in the system for generating a resource partitioning weight of an access point shown in FIG. 4.

The linear quadratic control system shown in FIG. 4 may be detailed as shown in FIG. 5. The difference vector $\Delta Z[t]$ and the difference integral vector $\Delta Z_1[t]$ between the statistical average user satisfaction $Z^D$ of the base station and the statistical average user satisfaction $Z_k^A$ of each relay node, and the current resource partitioning weight vector w[t] of each access point may be used as the input of feedback gain matrix F, to obtain the change rate u[t] of the resource partitioning weight of each access point. Then, u[t] is integrated, to obtain the variation δw[t] of the resource partitioning weight of each access point, so the resource partitioning weight vector w[t] of each access point is determined.

In Embodiment 2 of the present invention, after the resource partitioning weight vector w[t] of each access point is determined, radio resources of each access point may be calculated according to formula (1) and allocated to each access point, and radio resources of the base station may be calculated according to formula (2) and allocated to the base station.

In the method for allocating resources in a relay cell according to Embodiment 2 of the present invention, after each access point obtains the radio resources allocated by the base station, user scheduling at the second level may be performed, to maximize network utility. For example, each access point may use a general scheduling rule based on a parameter γ for user scheduling. For example, when the parameter γ=0, the utility of a user m changes to $U_m(r_m)=r_m$ and a maximized network utility is:

$$U_N(\cdots, x_{ij}^{(m)}, \cdots, \gamma) \underset{\gamma=0}{=} \sum_{m=1}^{M} \sum_{i=1}^{N} \sum_{j=1}^{N} b_{ij}^{(m)} x_{ij}^{(m)}$$

When the parameter γ=1, the user rate is proportionally fair, and in this situation, a maximized network utility is:

$$U_N(\cdots, x_{ij}^{(m)}, \cdots, \gamma) \underset{\gamma=1}{=} \sum_{m=1}^{M} \log\left(\sum_{i=1}^{N} \sum_{j=1}^{N} b_{ij}^{(m)} x_{ij}^{(m)}\right)$$

When the parameter γ is equal to 2, a maximized network utility is:

$$U_N(\cdots, x_{ij}^{(m)}, \cdots, \gamma) \underset{\gamma=2}{=} -\sum_{m=1}^{M} \frac{1}{\sum_{i=1}^{N} \sum_{j=1}^{N} b_{ij}^{(m)} x_{ij}^{(m)}}$$

When the parameter γ→∞, a maximized network utility approaches max-min fair scheduling.

It can be seen that a scheduling method with different scheduling rules can be obtained by modifying the value of the parameter γ. Therefore, the user scheduling performed by using the general scheduling rule based on the parameter γ may be summarized as follows:

$$\max. \sum_{m=1}^{M} \frac{1}{1-\gamma} \left( \frac{1}{T_b} \sum_{i=1}^{N} \sum_{j=1}^{N} b_{ij}^{(m)} x_{ij}^{(m)} \right)^{1-\gamma}$$

$$\text{s.t.} \sum_{m=1}^{N} \sum_{j=1}^{N} x_{ij}^{(m)} \le \frac{T}{2}, 1 \le i \le N,$$

$$\sum_{m=1}^{M} \sum_{i=1}^{N} x_{ij}^{(m)} \le \frac{T}{2}, 1 \le i \le N,$$

$$x_{ij}^{(m)} \in \left\{ 0, \ldots, \frac{T}{2} \right\}, 1 \le i, j \le N, 1 \le m \le M,$$

where max.* indicates maximization of network utility, M indicates the number of users, N indicates the total number of the radio resource blocks in the relay cell, $T_b$ indicates a duration of each radio resource block, $b_{ij}^m$ indicates the bit number of a user m on a subcarrier pairing (i,j), and $x_{ij}^{(m)}$ indicates the number of the radio resource blocks allocated to the user m on the subcarrier pairing (i,j).

In Embodiment 2 of the present invention, a combined optimization method of resource allocation and user scheduling is used, that is, after the resource allocation at the first level, scheduling rules corresponding to different values of the parameter γ are used for user scheduling in the user scheduling at the second level, to maximize the network utility. For example, if the resource allocation method at the first level aims to satisfy the user fairness, through the resource allocation method at the first level, the system can ensure that fairness of each user is satisfied in a long statistical time. When the user scheduling at the second level is performed, the scheduling rule with γ being equal to 0 may be used to implement instantaneous maximization of the system throughout. Through the combined optimization method, a KPI requirement in a long statistical time of the system is satisfied and the network utility is maximized.

In Embodiment 2 of the present invention, a corresponding relationship as shown in Table 1 may exist between the preset value O in the resource allocation at the first level and the parameter γ in the user scheduling at the second level.

TABLE 1

Corresponding relationship between the preset value O and the parameter γ

| O | Value of γ |
|---|---|
| 0 | 0 |
| Maximum value $O_{max}$ | 1 |

When O is 0, it indicates that the user fairness is satisfied, and in this situation, if the parameter γ is 0, the network utility in the user scheduling is maximized. When O is the maximum value $O_{max}$, it indicates that the system capacity maximization is satisfied, and in this situation, if the value of γ is 1, the user fairness in the user scheduling can be well satisfied.

In Embodiment 2 of the present invention, in the resource allocation at the first level, the base station may determine the resource partitioning weight of each access point by using the difference between the statistical average user satisfaction $\bar{Z}^D$ of the base station and the average user satisfaction $\bar{Z}_k^A$ of each relay node approaching the preset value O as a setting condition, calculate the radio resources of each access point according to the resource partitioning weight of each access point, and allocate the radio resources to each access point. When the preset value is 0, the statistical average user satisfaction of each access point in the relay cell is identical. In this situation, the user fairness of each access point in the relay cell is optimized. When the preset value is greater, the system capacity is larger. This sacrifices the user fairness. Therefore, compromise between the user fairness and the system capacity may be achieved by selecting a proper preset value. In this way, in the embodiment of the present invention, effective allocation of the resources in the relay cell is implemented and the requirements for system user fairness and system capacity are satisfied. In addition, in Embodiment 2 of the present invention, scheduling rules corresponding to different parameters γ may be selected for user scheduling in the user scheduling at the second level so that the network utility is maximized while the radio resource allocation to access points is implemented.

Embodiment 3

Figure 6:
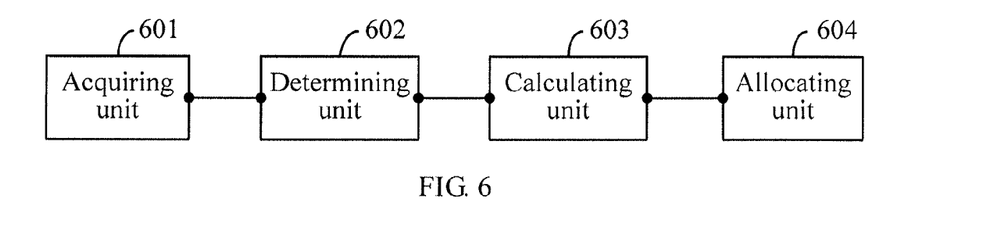
FIG. 6 is a schematic structural diagram of a base station according to an embodiment of the present invention.

FIG. 6 is a schematic structural diagram of a base station according to Embodiment 3 of the present invention. The base station according to Embodiment 3 of the present invention is applied in a relay network. The base station may include:

an acquiring unit 601, configured to acquire statistical average user satisfaction of each access point in a relay cell, where the access point includes the base station and a relay node in the relay cell, and the statistical average user satisfaction is an average ratio of a total user rate obtained by an access point to a total user rate required by the access point, where the average ratio is in a statistical period;

a determining unit 602, configured to determine a resource partitioning weight of each access point when a difference between the statistical average user satisfaction of the base station and the statistical average user satisfaction of each relay node approaches a preset value;

a calculating unit 603, configured to calculate radio resources of each access point according to the resource partitioning weight of each access point; and an allocating unit 604, configured to allocate the radio resources of each access point to each access point.

Figure 7:
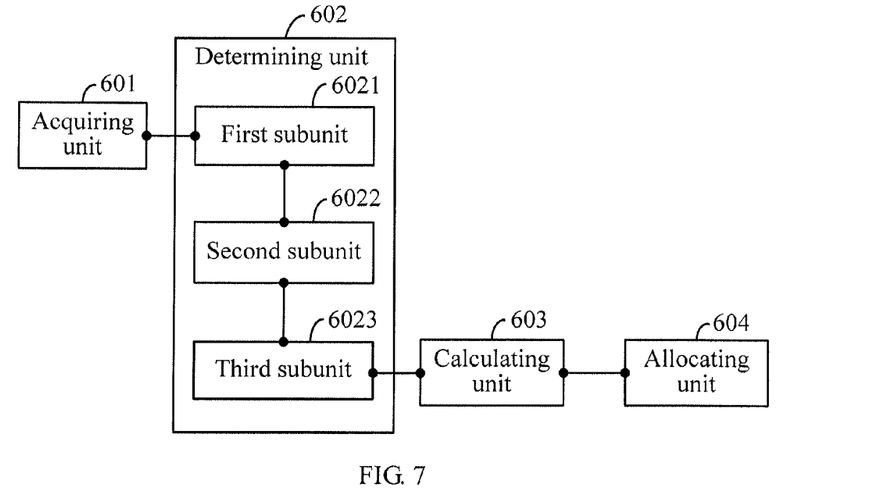
FIG. 7 is a schematic structural diagram of another base station according to an embodiment of the present invention.

FIG. 7 is a schematic structural diagram of another base station according to an embodiment of the present invention. The base station shown in FIG. 7 is obtained by optimizing the base station shown in FIG. 6. In the base station as shown in FIG. 7, the determining unit 602 may include:

a first subunit 6021, configured to, when the difference between the statistical average user satisfaction of the base station and the statistical average user satisfaction of each relay node approaches the preset value, calculate a change rate of the resource partitioning weight of each access point according to a formula for calculating a change rate of a resource partitioning weight, where the formula for calculating a change rate of a resource partitioning weight satisfies: u=−Fx, where u indicates a change rate vector of the resource partitioning weight of each access point; F indicates a feedback gain matrix; and x indicates a status vector and x satisfies the following condition:

$$x[t] = \begin{bmatrix} \Delta \overline{Z}[t] \\ \Delta \overline{Z}_1[t] \\ w[t] \end{bmatrix},$$

where $\Delta \overline{Z}[t]$ indicates a difference vector between the statistical average user satisfaction of the base station and the statistical average user satisfaction of each relay node; $\Delta \overline{Z}_1[t]$ indicates an integral vector of the difference between the statistical average user satisfaction of the base station and the statistical average user satisfaction of each relay node; w[t] indicates a current resource partitioning weight vector of each access point; and t indicates a calculation time;

a second subunit 6022, configured to integrate the change rate of the resource partitioning weight of each access point, to obtain a variation of the resource partitioning weight of each access point; and a third subunit 6023, configured to calculate a sum of the variation of the resource partitioning weight of each access point and a current resource partitioning weight of each access point, to obtain the resource partitioning weight of each access point.

Figure 8:
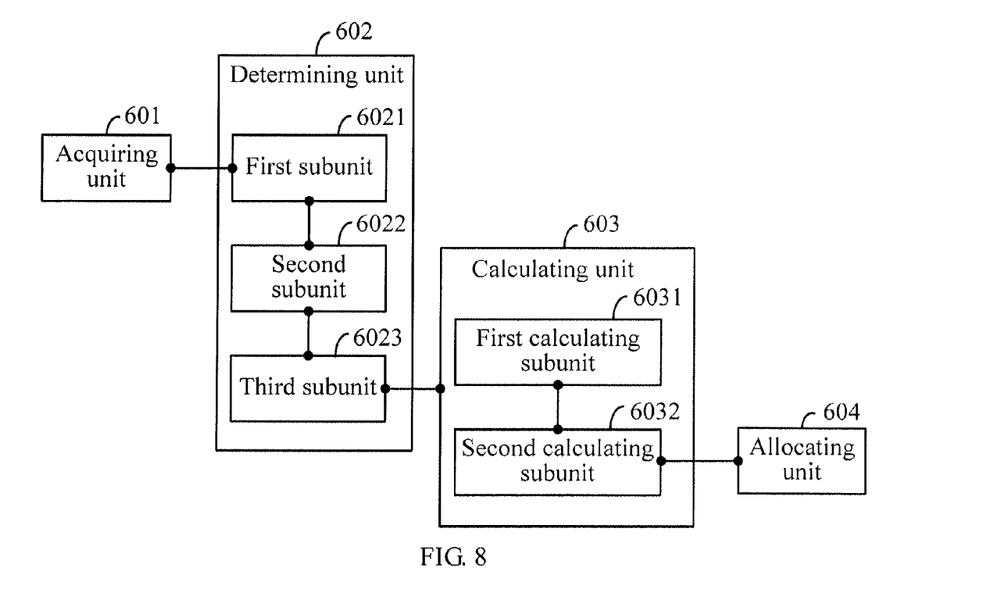
FIG. 8 is a schematic structural diagram of another base station according to an embodiment of the present invention.

FIG. 8 is a schematic structural diagram of another base station according to an embodiment of the present invention. The base station shown in FIG. 8 is obtained by optimizing the base station shown in FIG. 7. In the base station shown in FIG. 8, the calculating unit 603 may include:

a first calculating subunit 6031, configured to calculate a proportion of the resource partitioning weight of each access point present in a sum of the resource partitioning weight of each access point; and a second calculating subunit 6032, configured to calculate a product of the resource partitioning weight of each access point and the number of radio resource blocks, to obtain the radio resources of each access point.

Figure 9:
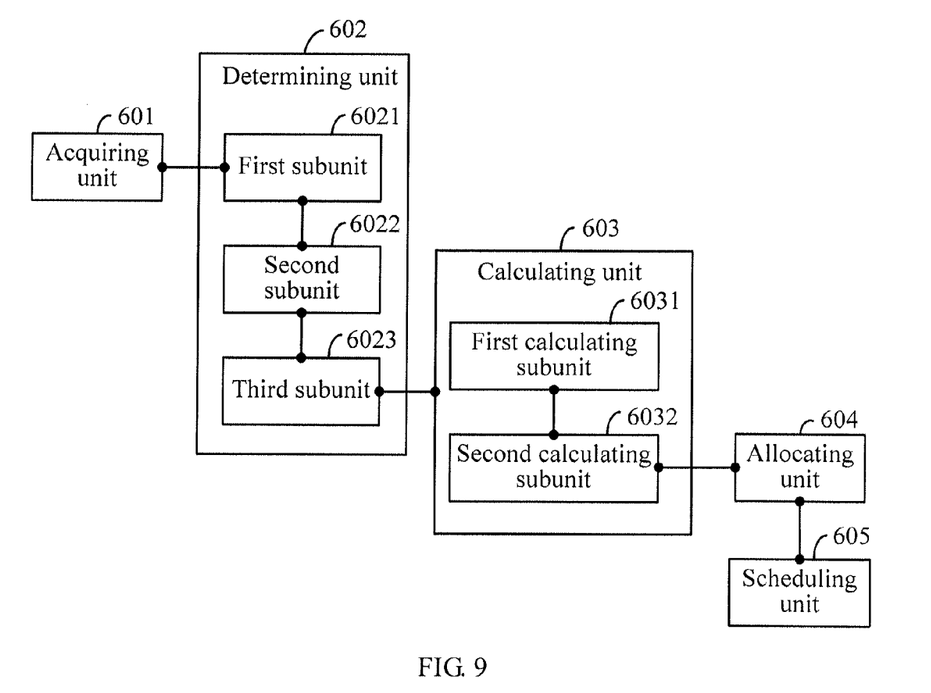
FIG. 9 is a schematic structural diagram of another base station according to an embodiment of the present invention.

FIG. 9 is a schematic structural diagram of another base station according to an embodiment of the present invention. The base station shown in FIG. 9 is obtained by optimizing the base station shown in FIG. 8. The base station shown in FIG. 9 may further include:

a scheduling unit 605, configured to perform user scheduling by using a general scheduling rule based on a parameter γ.

The parameter γ satisfies the following conditions:

$$\max. \sum_{m=1}^{M} \frac{1}{1-\gamma} \left( \frac{1}{T_b} \sum_{i=1}^{N} \sum_{j=1}^{N} b_{ij}^{(m)} x_{ij}^{(m)} \right)^{1-\gamma}$$

$$\text{s.t.} \sum_{m=1}^{N} \sum_{j=1}^{N} x_{ij}^{(m)} \leq \frac{T}{2}, 1 \leq i \leq N,$$

$$\sum_{m=1}^{M} \sum_{i=1}^{N} x_{ij}^{(m)} \leq \frac{T}{2}, 1 \leq i \leq N,$$

$$x_{ij}^{(m)} \in \left\{ 0, \ldots, \frac{T}{2} \right\}, 1 \leq i, j \leq N, 1 \leq m \leq M,$$

where max.* indicates maximization of network utility, M indicates the number of users, N indicates the total number of radio resource blocks, $T_b$ indicates a duration of each radio resource block, $b_{ij}^m$ indicates the bit number of a user m on a subcarrier pairing (i,j), and $x_{ij}^{(m)}$ indicates the number of radio resource blocks allocated to the user m on the subcarrier pairing (i,j).

In the base station according to the embodiment of the present invention, the preset value is greater than or equal to 0. When the preset value is 0, the resources in the relay cell are partitioned based on user fairness. In this situation, the user fairness is optimized. When the preset value is the maximum value $O_{max}$, the resources in the relay cell are partitioned based on system capacity. In this situation, the system capacity is maximized. When the preset value is between 0 and the maximum value $O_{max}$, the resources in the relay cell are partitioned based on a compromise between the user fairness and the system capacity. In this situation, the requirements for user fairness and system capacity are satisfied.

In the base station according to the embodiment of the present invention, the acquiring unit 601 acquires the statistical average user satisfaction $\overline{Z}^D$ of the base station and the statistical average user satisfaction $\overline{Z}_k^A$ of each relay node in the relay cell; the determining unit 602 determines the resource partitioning weight of each access point when the difference between the statistical average user satisfaction $\overline{Z}^D$ of the base station and the statistical average user satisfaction $\overline{Z}_k^A$ of each relay node approaches the preset value; the calculating unit 603 calculates the radio resources of each access point according to the resource partitioning weight of each access point; and the allocating unit 604 allocates the radio resources of each access point to each access point. When the preset value is 0, the statistical average user satisfaction of each access point in the relay cell is identical. In this situation, the user fairness of each access point in the relay cell is optimized. When the preset value is greater, the system capacity is larger. This sacrifices the user fairness. Therefore, compromise between the user fairness and the system capacity may be achieved by selecting a proper preset value. In this way, the base station according to the embodiment of the present invention can implement the effective allocation of the resources in the relay cell and satisfy the requirements for system user fairness and system capacity. In addition, in the base station according to the embodiment of the present invention, the scheduling unit 605 may select scheduling rules corresponding to different parameters γ for user scheduling, so that the network utility is maximized while the radio resource allocation to the access points is implemented.

Embodiment 4

Figure 10:
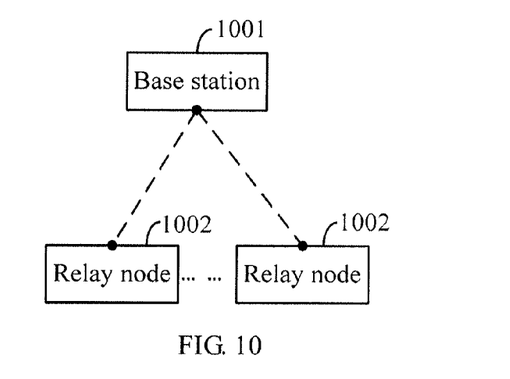
FIG. 10 is a schematic structural diagram of a relay cell system according to an embodiment of the present invention.

FIG. 10 is a schematic structural diagram of a relay cell system according to Embodiment 4 of the present invention. As shown in FIG. 10, the system may include:

a base station 1001, configured to acquire statistical average user satisfaction of each access point in a relay cell, where the access point includes the base station 1001 and a relay node 1002 in the relay cell, and the statistical average user satisfaction is an average ratio of a total user rate obtained by an access point to a total user rate required by the access point, where the average ratio is in a statistical period; determine a resource partitioning weight of each access point when a difference between the statistical average user satisfaction of the base station 1001 and the statistical average user satisfaction of each relay node 1002 approaches a preset value; and calculate radio resources of each access point according to the resource partitioning weight of each access point and allocate the radio resources to each access point; and the relay node 1002, configured to periodically report the statistical average user satisfaction of the relay node to base station 1001 and receive the radio resources allocated by base station 1001.

In the relay cell system according to the embodiment of the present invention, the preset value is greater than or equal to 0. When the preset value is 0, the resources in the relay cell are partitioned based on user fairness. In this situation, the user fairness is optimized. When the preset value is the maximum value $O_{max}$, the resources in the relay cell are partitioned based on system capacity. In this situation, the system capacity is maximized. When the preset value is between 0 and the maximum value $O_{max}$, the resources in the relay cell are partitioned based on a compromise between the user fairness and the system capacity. In this situation, the requirements for user fairness and system capacity are satisfied.

As an alternative implementation, in the relay cell system according to Embodiment 4 of the present invention, the base station 1001 and the relay node 1002 are further respectively configured to perform user scheduling by using a general scheduling rule based on a parameter γ.

The parameter γ satisfies the following conditions:

$$\max. \sum_{m=1}^{M} \frac{1}{1-\gamma} \left( \frac{1}{T_b} \sum_{i=1}^{N} \sum_{j=1}^{N} b_{ij}^{(m)} x_{ij}^{(m)} \right)^{1-\gamma}$$

$$\text{s.t.} \sum_{m=1}^{N} \sum_{j=1}^{N} x_{ij}^{(m)} \le \frac{T}{2}, 1 \le i \le N,$$

$$\sum_{m=1}^{M} \sum_{i=1}^{N} x_{ij}^{(m)} \le \frac{T}{2}, 1 \le i \le N,$$

$$x_{ij}^{(m)} \in \left\{ 0, \ldots, \frac{T}{2} \right\}, 1 \le i, j \le N, 1 \le m \le, M,$$

where max.* indicates maximization of network utility, M indicates the number of users, N indicates the total number of radio resource blocks in the relay cell, $T_b$ indicates a duration of each radio resource block, $b_{ij}^m$ indicates the bit number of a user m on a subcarrier pairing (i,j), and $x_{ij}^{(m)}$ indicates the number of radio resource blocks allocated to the user m on the subcarrier pairing (i,j).

In the relay cell system according to the embodiment of the present invention, the base station 1001 acquires the statistical average user satisfaction $Z^D$ of the base station and the average user satisfaction $Z_k^A$ of each relay node in the relay cell; determines the resource partitioning weight of each access point when the difference between the statistical average user satisfaction $Z^D$ of the base station 1001 and the statistical average user satisfaction $Z_k^A$ of each relay node 1002 approaches the preset value; calculates the radio resources of each access point according to the resource partitioning weight of each access point and allocates the radio resources of each access point to each access point. When the preset value is 0, the average user satisfaction of each access point in the relay cell is identical. In this situation, the user fairness of each access point in the relay cell is optimized. When the preset value is greater, the system capacity is larger. This sacrifices the user fairness. Therefore, compromise between the user fairness and the system capacity may be achieved by selecting a proper preset value. In this way, the relay cell system according to the embodiment of the present invention can implement the effective allocation of the resources in the relay cell and satisfy the requirements for system user fairness and system capacity. In addition, in the relay cell system according to the embodiment of the present invention, scheduling rules corresponding to different parameters γ may be selected for user scheduling, so that the network utility is maximized while the radio resource allocation to the access points is implemented.

Persons of ordinary skill in the art should understand that all or a part of the steps of the methods in the embodiments may be implemented by a program instructing relevant hardware. The program may be stored in a computer readable storage medium. The storage medium may include: a flash memory, a read-only memory (Read-Only Memory, ROM), a random access memory (Random Access Memory, RAM), a magnetic disk, an optical disk, and the like.

The method for allocating radio resources in a relay cell, the base station, and the system according to the embodiments of the present invention are described in detail above. The principle and implementation of the present invention are described herein through specific examples. The description about the embodiments is merely provided for ease of understanding of the method and core ideas of the present invention. Persons of ordinary skill in the art can make variations to the present invention in terms of the specific implementations and application scopes according to the ideas of the present invention. Therefore, the content of the specification shall not be construed as a limit to the present invention.

What is claimed is:

1. A method for allocating radio resources in a relay cell, comprising:

acquiring, by a base station, statistical average user satisfaction of each access point in a relay cell, wherein the access point comprises the base station and a relay node in the relay cell, the statistical average user satisfaction is an average ratio of a total user rate obtained by an access point to a total user rate required by the access point, and wherein the average ratio is in a statistical period; and determining, by the base station, a resource partitioning weight of each access point when a difference between the statistical average user satisfaction of the base station and the statistical average user satisfaction of each relay node approaches a preset value;

calculating, by the base station, radio resources of each access point according to the resource partitioning weight of each access point; and allocating, by the base station, the radio resources to each access point.

2. The method according to claim 1, wherein the determining, by the base station, the resource partitioning weight of each access point when the difference between the statistical average user satisfaction of the base station and the statistical average user satisfaction of each relay node approaches the preset value, comprises:

calculating, by the base station, a change rate of the resource partitioning weight of each access point according to a formula for calculating a change rate of a resource partitioning weight when the difference between the statistical average user satisfaction of the base station and the statistical average user satisfaction of each relay node approaches the preset value;

wherein the formula for calculating a change rate of a resource partitioning weight satisfies: u=−Fx, wherein u indicates a change rate vector of the resource partitioning weight of each access point; F indicates a feedback gain matrix; and x indicates a status vector and x satisfies $$x[t] = \begin{bmatrix} \Delta \bar{Z}[t] \\ \Delta \bar{Z}_1[t] \\ w[t] \end{bmatrix},$$

wherein $\Delta \bar{Z}[t]$ indicates a difference vector between the statistical average user satisfaction of the base station and the statistical average user satisfaction of each relay node; $\Delta \bar{Z}_I[t]$ indicates an integral vector of the difference between the statistical average user satisfaction of the base station and the statistical average user satisfaction of each relay node; w[t] indicates a current resource partitioning weight vector of each access point; and t indicates a calculation time;

integrating, by the base station, the change rate of the resource partitioning weight of each access point, to obtain a variation of the resource partitioning weight of each access point; and calculating, by the base station, a sum of the variation of the resource partitioning weight of each access point and a current resource partitioning weight of the access point, to obtain the resource partitioning weight of each access point.

3. The method according to claim 1, wherein the calculating, by the base station, the radio resources of each access point according to the resource partitioning weight of each access point comprises:

calculating, by the base station, a proportion of the resource partitioning weight of each access point present in a sum of the resource partitioning weight of each access point; and calculating, by the base station, a product of the proportion of the resource partitioning weight of each access point and the total number of radio resource blocks in the relay cell, to obtain the radio resources of each access point.

4. The method according to claim 1, wherein the preset value is greater than or equal to 0.

5. The method according to claim 1, wherein after the calculating, by the base station, the radio resources of each access point according to the resource partitioning weight of each access point, and allocating the radio resources to each access point, the method further comprises:

performing, by each access point, user scheduling by using a general scheduling rule based on a parameter $\gamma$, wherein the parameter $\gamma$ satisfies the following conditions:

$$\max. \sum_{m=1}^{M} \frac{1}{1-\gamma} \left( \frac{1}{T_b} \sum_{i=1}^{N} \sum_{j=1}^{N} b_{ij}^{(m)} x_{ij}^{(m)} \right)^{1-\gamma}$$

$$\text{s.t.} \sum_{m=1}^{N} \sum_{j=1}^{N} x_{ij}^{(m)} \leq \frac{T}{2}, 1 \leq i \leq N,$$

$$\sum_{m=1}^{M} \sum_{i=1}^{N} x_{ij}^{(m)} \leq \frac{T}{2}, 1 \leq i \leq N,$$

$$x_{ij}^{(m)} \in \left\{ 0, \ldots, \frac{T}{2} \right\}, 1 \leq i, j \leq N, 1 \leq m \leq M,$$

wherein max.* indicates maximization of network utility, M indicates the number of users, N indicates the total number of radio resource blocks in the relay cell, $T_b$ indicates a duration of each radio resource block, $b_{ij}^{m}$ indicates the bit number of a user m on a subcarrier pairing (i,j), and $x_{ij}^{(m)}$ indicates the number of radio resource blocks allocated to the user m on the subcarrier pairing (i,j).

6. A base station applied in a relay cell, comprising:
a processor, and
a non-transitory processor-readable medium having processor-executable instructions stored thereon that, when executed by the processor, cause the base station to:

acquire statistical average user satisfaction of each access point in the relay cell, wherein the access point comprises the base station and a relay node in the relay cell, and the statistical average user satisfaction is an average ratio of a total user rate obtained by an access point to the total user rate required by the access point, and wherein the average ratio is in a statistical period;

determine a resource partitioning weight of each access point when a difference between the statistical average user satisfaction of the base station and the statistical average user satisfaction of each relay node approaches a preset value;

calculate radio resources of each access point according to the resource partitioning weight of each access point; and allocate the radio resources of each access point to each access point.

7. The base station according to claim 6, wherein the instructions further cause the base station to calculate a change rate of the resource partitioning weight of each access point according to a formula for calculating a change rate of a resource partitioning weight when the difference between the statistical average user satisfaction of the base station and the statistical average user satisfaction of each relay node approaches the preset value;

wherein the formula for calculating a change rate of a resource partitioning weight satisfies: u=−Fx, wherein u indicates a change rate vector of the resource partitioning weight of each access point; F indicates a feedback gain matrix; and x indicates a status vector and x satisfies $$x[t] = \begin{bmatrix} \Delta \bar{Z}[t] \\ \Delta \bar{Z}_I[t] \\ w[t] \end{bmatrix},$$

wherein $\Delta \bar{Z}[t]$ indicates a difference vector between the statistical average user satisfaction of the base station and the statistical average user satisfaction of each relay node; $\Delta \bar{Z}_I[t]$ indicates an integral vector of the difference between the statistical average user satisfaction of the base station and the statistical average user satisfaction of each relay node; w[t] indicates a current resource partitioning weight vector of each access point; and t indicates a calculation time;

integrate the change rate of the resource partitioning weight of each access point, to obtain a variation of the resource partitioning weight of each access point; and calculate a sum of the variation of the resource partitioning weight of each access point and a current resource partitioning weight of the access point, to obtain the resource partitioning weight of each access point.

8. The base station according to claim 6, wherein instructions further cause the base station to:

calculate a proportion of the resource partitioning weight of each access point present in a sum of the resource partitioning weight of each access point; and calculate a product of the proportion of the resource partitioning weight of each access point and the total number of radio resource blocks in the relay cell, to obtain the radio resources of each access point.

9. The base station according to claim 6, wherein the preset value is greater than or equal to 0.

10. The base station according to claim 6, wherein instructions further cause the base station to
perform user scheduling by using a general scheduling rule based on a parameter γ, wherein
the parameter γ satisfies:

$$\max. \sum_{m=1}^{M} \frac{1}{1-\gamma} \left( \frac{1}{T_b} \sum_{i=1}^{N} \sum_{j=1}^{N} b_{ij}^{(m)} x_{ij}^{(m)} \right)^{1-\gamma}$$

$$\text{s.t.} \sum_{m=1}^{N} \sum_{j=1}^{N} x_{ij}^{(m)} \leq \frac{T}{2}, 1 \leq i \leq N,$$

$$\sum_{m=1}^{M} \sum_{i=1}^{N} x_{ij}^{(m)} \leq \frac{T}{2}, 1 \leq i \leq N,$$

$$x_{ij}^{(m)} \in \left\{ 0, \ldots, \frac{T}{2} \right\}, 1 \leq i, j \leq N, 1 \leq m \leq, M,$$

wherein max.* indicates maximization of network utility, M indicates the number of users, N indicates the total number of radio resource blocks in the relay cell, $T_b$ indicates a duration of each radio resource block, $b_{ij}^{m}$ indicates the bit number of a user m on a subcarrier pairing (i,j), and $x_{ij}^{(m)}$ indicates the number of radio resource blocks allocated to the user m on the subcarrier pairing (i,j).

11. A relay cell system, comprising:
a base station, configured to acquire statistical average user satisfaction of each access point in a relay cell, wherein the access point comprises the base station and a relay node in the relay cell, and the statistical average user satisfaction is an average ratio of a total user rate obtained by an access point to a total user rate required by the access point, and wherein the average ratio is in a statistical period; determine a resource partitioning weight of each access point when a difference between the statistical average user satisfaction of the base station and the statistical average user satisfaction of each relay node approaches a preset value; calculate radio resources of each access point according to the resource partitioning weight of each access point and allocate the radio resources to each access point; and
the relay node, configured to report the statistical average user satisfaction of the relay node to the base station and receive the radio resources allocated by the base station.

12. The system according to claim 11, wherein the preset value is greater than or equal to 0.

13. The system according to claim 12, wherein
the base station and the relay node are further respectively configured to perform user scheduling by using a general scheduling rule based on a parameter γ;
wherein the parameter γ satisfies:

$$\max. \sum_{m=1}^{M} \frac{1}{1-\gamma} \left( \frac{1}{T_b} \sum_{i=1}^{N} \sum_{j=1}^{N} b_{ij}^{(m)} x_{ij}^{(m)} \right)^{1-\gamma}$$

$$\text{s.t.} \sum_{m=1}^{N} \sum_{j=1}^{N} x_{ij}^{(m)} \leq \frac{T}{2}, 1 \leq i \leq N,$$

$$\sum_{m=1}^{M} \sum_{i=1}^{N} x_{ij}^{(m)} \leq \frac{T}{2}, 1 \leq i \leq N,$$

$$x_{ij}^{(m)} \in \left\{ 0, \ldots, \frac{T}{2} \right\}, 1 \leq i, j \leq N, 1 \leq m \leq, M,$$

wherein max.* indicates maximization of network utility, M indicates the number of users, N indicates the total number of radio resource blocks in the relay cell, $T_b$ indicates a duration of each radio resource block, $b_{ij}^{m}$ indicates the bit number of a user m on a subcarrier pairing (i,j), and $x_{ij}^{(m)}$ indicates the number of radio resource blocks allocated to the user m on the subcarrier pairing (i,j).

* * * * *